United States Patent
Rickis

(10) Patent No.: US 9,453,462 B2
(45) Date of Patent: Sep. 27, 2016

(54) FILTER BYPASS VALVE

(75) Inventor: Aaron Rickis, Feeding Hills, MA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 1130 days.

(21) Appl. No.: 13/600,506

(22) Filed: Aug. 31, 2012

(65) Prior Publication Data

US 2014/0311585 A1    Oct. 23, 2014

(51) Int. Cl.
  F16K 15/00     (2006.01)
  F02C 7/232     (2006.01)
  F16K 15/02     (2006.01)

(52) U.S. Cl.
  CPC .............. F02C 7/232 (2013.01); F16K 15/025 (2013.01); *Y10T 137/0491* (2015.04); *Y10T 137/7925* (2015.04); *Y10T 137/86019* (2015.04)

(58) Field of Classification Search
  CPC .............. F02C 7/232; F16K 15/025; Y10T 137/86019; Y10T 137/7925; Y10T 137/0491; Y10T 137/7904
  See application file for complete search history.

(56) References Cited

U.S. PATENT DOCUMENTS

| | | | |
|---|---|---|---|
| 3,339,574 A * | 9/1967 | Erb et al. | 137/102 |
| 4,458,713 A | 7/1984 | Wernberg | |
| 4,876,857 A * | 10/1989 | Feltz et al. | 60/734 |
| 5,013,220 A * | 5/1991 | Nakagawa et al. | 417/310 |
| 6,195,978 B1 | 3/2001 | Futa, Jr. | |
| 6,294,083 B1 | 9/2001 | Lee et al. | |
| 6,328,056 B1 | 12/2001 | Kumar et al. | |
| 6,582,593 B2 | 6/2003 | Wolford et al. | |
| 6,583,525 B2 | 6/2003 | Dyer et al. | |
| 6,789,562 B2 | 9/2004 | Dyer et al. | |
| 6,972,087 B2 | 12/2005 | Wolford et al. | |
| 7,322,373 B2 * | 1/2008 | Lewis | 137/516.29 |
| 7,981,279 B2 | 7/2011 | Pabst | |
| 8,015,825 B2 | 9/2011 | Elder et al. | |
| 8,083,938 B2 | 12/2011 | Lepine et al. | |
| 8,118,998 B2 | 2/2012 | Bagci et al. | |
| 8,181,669 B2 | 5/2012 | Dehais et al. | |
| 8,316,880 B2 * | 11/2012 | Grosskopf et al. | 137/504 |
| 8,485,218 B2 * | 7/2013 | Lemmers et al. | 137/454.6 |
| 2010/0243940 A1 * | 9/2010 | Terada et al. | 251/320 |
| 2010/0283333 A1 * | 11/2010 | Lemmers et al. | 310/54 |
| 2010/0283338 A1 * | 11/2010 | Grosskopf et al. | 310/66 |

FOREIGN PATENT DOCUMENTS

| | | | |
|---|---|---|---|
| GB | 2048801 A | | 12/1980 |
| KR | 101120841 | * | 3/2012 |

* cited by examiner

*Primary Examiner* — Jessica Cahill
(74) *Attorney, Agent, or Firm* — Carlson, Gaskey & Olds, PC

(57) ABSTRACT

A piston has a closure face closing off a cavity defined radially inwardly and downstream of an upstream end. The closure face is spaced from the upstream end by a first distance. The piston has a cavity extending in a downstream direction away from an opposed side of the closure face to a second end. A piston diameter is defined to an outer periphery of a cylindrical portion forming a seal face. A ratio of the piston diameter to the first distance is between 3.05 and 6.31. A valve sleeve has windows formed to allow flow of fluid from a sleeve internal bore through the windows and to a downstream port. A ratio of the inner diameter to the axial dimension of the windows is between 0.91 and 1.02. A ratio of the inner diameter to a circumferential dimension of the windows is between 1.55 and 1.85.

6 Claims, 3 Drawing Sheets

FILTER BYPASS VALVE

BACKGROUND OF THE INVENTION

This application relates to a filter bypass valve which may be utilized in a fuel line for an aircraft engine.

Aircraft engines are typically provided by gas turbine engines. Fuel is delivered into a combustor section, and sometimes other portions of the gas turbine engine. The fuel is driven by a fuel pump from a fuel sump, and passes through a filter on the way to the engine.

Should the filter become clogged, pressure will build up in the filter. Thus, it is known to include a bypass valve to allow flow around the filter should the filter become clogged.

The existing bypass valves may sometimes result in undesirably high pressure losses.

SUMMARY OF THE INVENTION

In an embodiment of the invention, a piston extends along an axial dimension with a seal face at an upstream end. A closure face closes off a cavity defined radially inwardly and downstream of the upstream end. The closure face is spaced from the upstream end by a first distance. The piston has a cavity extending in a downstream direction away from an opposed side of the closure face to a second end. A piston diameter is defined to an outer periphery of a cylindrical portion forming the seal face. A ratio of the piston diameter to the first distance is between 3.85 and 4.43.

In another embodiment of the invention, a valve sleeve body extends between an upstream end and a second end. A sleeve internal bore extends between the upstream and second end. Windows are formed in the valve sleeve to allow flow of fluid from the bore through the windows and to a downstream port. The bore has an inner diameter. The window has an axial dimension and a circumferential dimension. A ratio of the inner diameter to the axial dimension is between 1.04 and 1.07. A ratio of the inner diameter to the circumferential direction is between 1.81 and 1.88. A bypass valve incorporating the valve sleeve and piston, and a fuel supply system incorporating the bypass valve are also disclosed.

These and other features may be best understood from the following drawings and specification.

DETAILED DESCRIPTION

Figure 1:
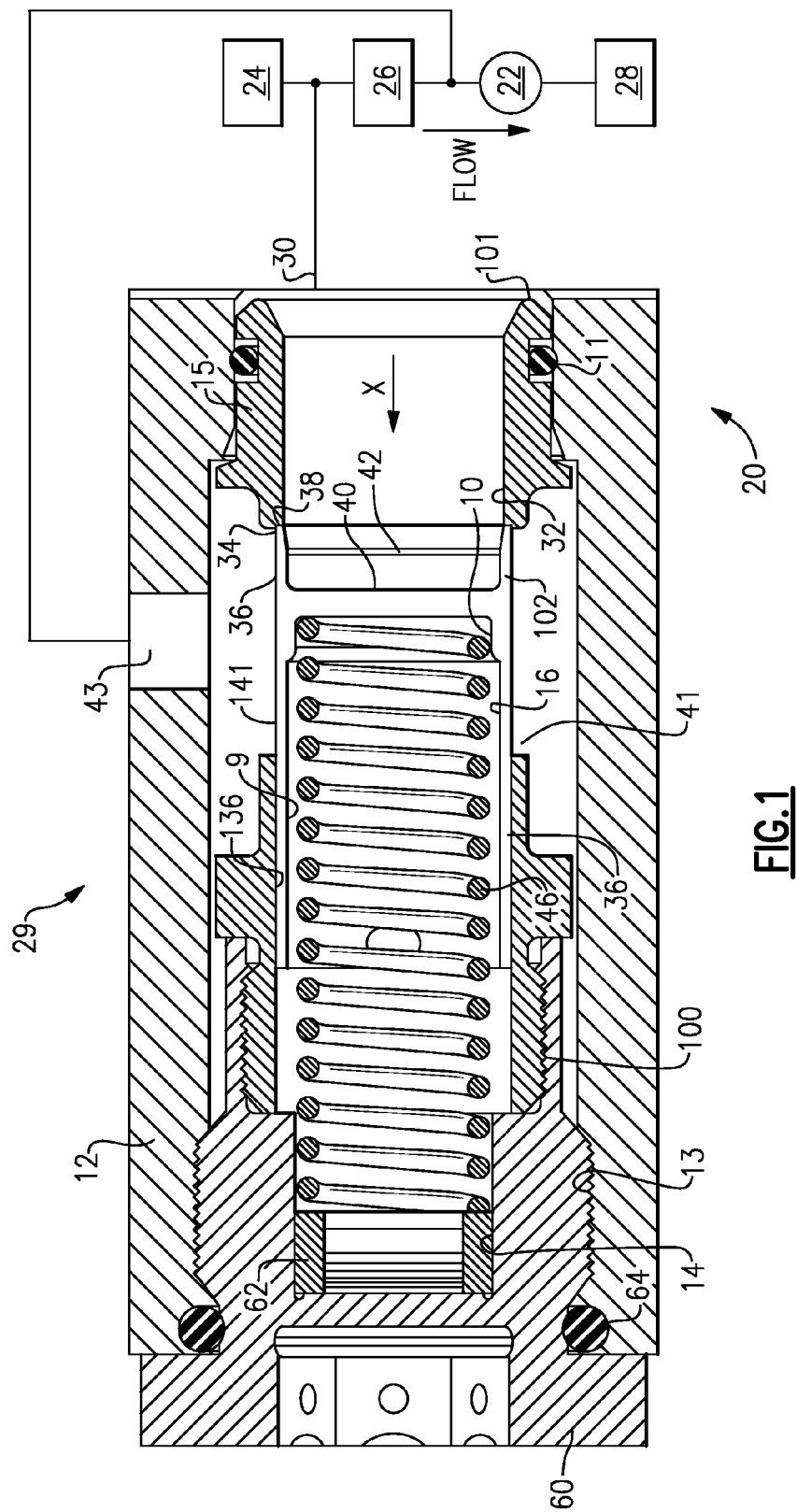
FIG. 1 shows an aircraft fuel supply system having a valve assembly.

FIG. 1 shows an aircraft fuel supply system 20 having a fuel pump 22 drawing fuel from a sump 24. The fuel passes through a filter 26 to the pump 22 and then out to an engine 28, all of which are shown schematically. A bypass valve 29 is positioned to see the pressure upstream of the filter 26 through a tap 30. Should the filter become clogged, then the pressure will become undesirably high, and the bypass valve 29 will open to allow fuel to flow around the filter 26 through a port 43 to the pump 22.

When the pressure upstream of the filter 26 is below a predetermined limit, a spring 46 biases a piston 36 against a valve seat defined by a sleeve 15 to prevent flow through the bypass valve 29. On the other hand, should the pressure exceed the predetermined limit, then the pressure will act in a direction X as shown in FIG. 1, and in opposition to the spring 46, to force the piston 36 away from a valve seat, and allow flow to bypass the filter 26. The valve seat will be described below.

In the valve 29, the valve sleeve 15 defines an inner upstream bore 32 extending to an upstream end 101, and a cylindrical surface or face 34. A downstream bore 136 receives the piston 36.

Face 34 of the sleeve 15 will provide a valve stop for piston 36, which is received in a cavity downstream of the face 34. As shown, piston 36 is generally cylindrical in shape and has a surface 38 abutting the face 34 such that the valve 29 seals along a generally cylindrical face. This generally cylindrical seal face is across an enlarged area compared to other pressure relief valves.

The piston 36 has a cavity 42 at an upstream end, and is defined by a closure wall face 40 that separates the cavity 42 from a downstream cavity, or spring cavity 16, within the piston 36. A cylindrical cup or boss 102 extends upstream from face 40. On an opposed side of the wall face 40, a spring 46 sits in cavity 16 and biases the face 38 into contact with the stop face 34. The piston 36 has a cylindrical outer surface 41 closely received in an inner surface of downstream bore 136 of the sleeve 15 to prevent fluid leakage therebetween.

As can be appreciated, the cavity 16 is defined by a first enlarged cylindrical portion 9 on the piston 36, and a smaller portion 10 spaced in an upstream direction relative to the portion 9. The spring 46 sits in the smaller portion 10.

A closure 60, shims 62, and seal 64 are at a downstream end of the valve 29. Sleeve 15 is threaded 100 into closure 60. The shims 62 provides a stop for the spring in the downstream end.

Figure 2:
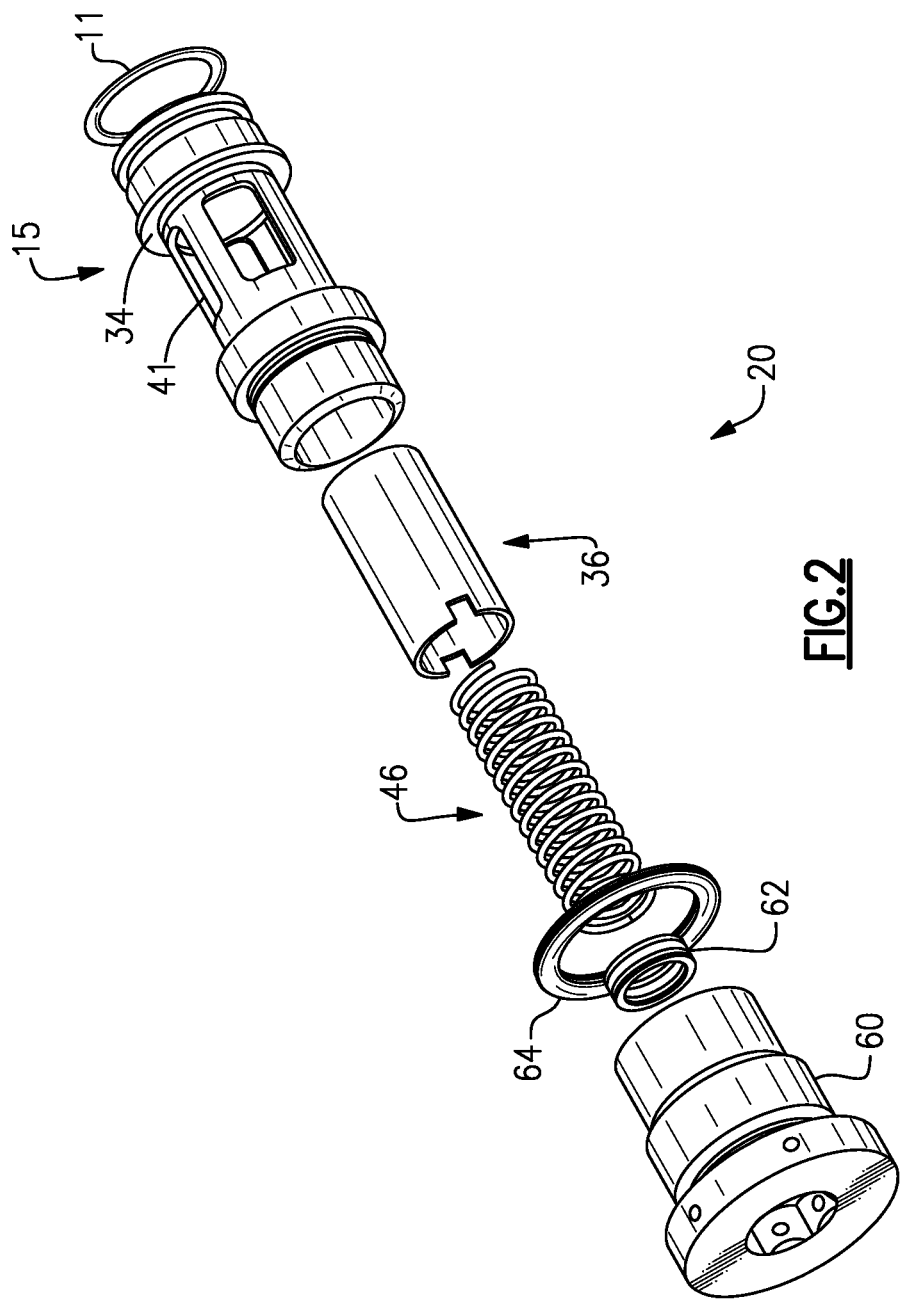
FIG. 2 shows the FIG. 1 valve assembly in an exploded view.

As shown in FIG. 2, the sleeve 15 includes valve windows 41 that allow the flow of the fuel to the port 43 (shown in FIG. 1) when the piston 36 is biased away from the face 34 in direction X. The windows are larger than used in the prior art. There are four windows 41 in one embodiment.

As can be appreciated, in assembling the valve, the piston 36 is inserted into the downstream bore 136, with the shim 62 and spring 46 received in cavity 16. Shim 62 is then placed in a cavity 14 in closure 60, and the sleeve 15 is threaded at 100 into the closure 60. The closure 60 may then be threaded, as shown at 13, into a main housing 12.

The valve will then operate as mentioned above.

Figure 3:
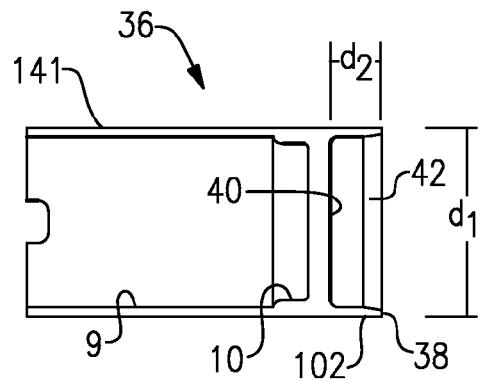
FIG. 3 is a detail of a piston.

FIG. 3 shows piston 36. As shown, an outer diameter $d_1$ is defined at the front seal surface 38. The cup 102 extends upstream of the face 40 for a distance $d_2$. In one embodiment, $d_1$ was 0.5974 inch (1.5174 cm) and $d_2$ was 0.145 inch (0.3683 cm). In embodiments, a ratio of $d_1$ to $d_2$ is between 3.05 and 6.31.

Figure 4A:
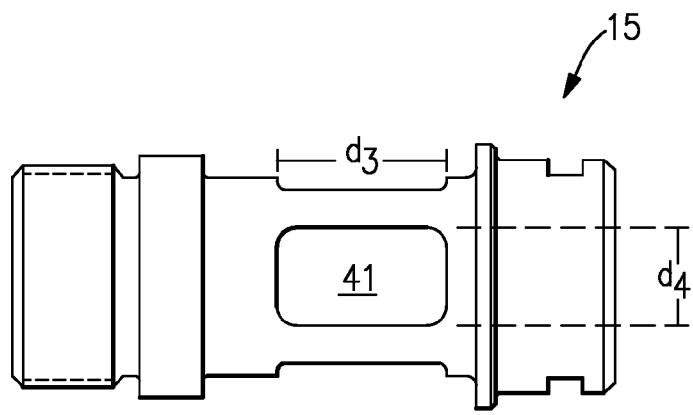
FIG. 4A is a detail of a valve sleeve.

FIG. 4A shows detail of the sleeve 15. A dimension $d_3$ of the window 41 could be defined as an axial dimension of the windows, while a dimension $d_4$ could be defined as a circumferential dimension. In one embodiment, $d_3$ was 0.570 inch (1.4478 cm) and $d_4$ was 0.325 inch (0.8255 cm).

Figure 4B:
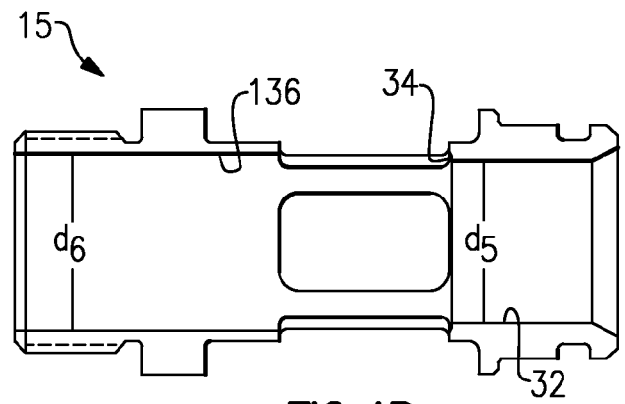
FIG. 4B is a section through the valve sleeve.

FIG. 4B shows a common diameter $d_5$ to the inner upstream bore 32. In one embodiment, $d_5$ was 0.550 inch (1.397 cm).

In embodiments, a ratio of $d_1$ to $d_5$ was between 1.07 and 1.0. A ratio of $d_5$ to $d_3$ was between 0.91 and 1.02, and a ratio of $d_5$ to $d_4$ was between 1.55 and 1.85. The diameter of a spool bore at 136 is $d_6$. In one embodiment, $d_6$ was 0.6 inch (1.52 cm). In embodiments, a ratio of $d_1$ to $d_6$ was between 0.99 and 1.01.

In a method of replacing a piston or valve sleeve in a bypass valve, at least one of a piston and sleeve is removed from a bypass valve housing, and at least one of a replacement valve or sleeve replaces the removed valve or sleeve. The valve or sleeve, which is replaced, is generally as disclosed above.

With a valve made according to the above description, the pressure losses across the valve are dramatically reduced when compared to the prior art.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A valve sleeve comprising:
   a valve sleeve body extending between an upstream end and a second downstream end, with a sleeve internal bore formed between said upstream and second ends, and windows being formed in said valve sleeve to allow flow of fluid from said bore through said windows and to a downstream port, said bore having an inner diameter, and said windows having an axial dimension and a circumferential dimension, and a ratio of said inner diameter to said axial dimension being between 0.91 and 1.02, and a ratio of said inner diameter to said circumferential dimension being between 1.55 and 1.85.

2. A bypass valve comprising:
   a valve sleeve received within a housing, and a piston biased by a spring such that an upstream end of said piston abuts a stop face on said valve sleeve through a cylindrical contact surface, and a tap for supplying a fluid pressure into a bore defined within said valve sleeve such that the fluid pressure will act against a bias force of said spring;
   the piston extending along an axial dimension with a seal face at an upstream end, and a closure face closing off a cavity defined radially inwardly and downstream of said upstream end, said closure face being spaced from said upstream end by a first distance, and said piston having a bore extending in a rearward direction away from an opposed side of said closure face to a second end, with a piston diameter defined to an outer periphery of a cylindrical portion forming said seal face, and a ratio of said piston diameter to said first distance being between 3.05 and 6.31;
   a valve sleeve extending between an upstream end and a second downstream end, with a sleeve internal bore formed between said upstream and second ends, and windows being formed in said valve sleeve to allow flow of fluid from said bore through said windows and to a downstream port, said bore having an inner diameter, and said windows having an axial dimension and a circumferential dimension, and a ratio of said inner diameter to said axial dimension being between 0.92 and 1.02, and a ratio of said inner diameter to said circumferential dimension being between 1.55 and 1.85; a ratio of said piston diameter to said inner diameter being between 1.08 and 1.09;
   said closure face also defining a second cavity extending in the downstream direction from the closure face, with the second cavity receiving the spring;
   said inner diameter of said cavity is taken in an upstream direction from said closure face, and said second cavity having a first enlarged cylindrical portion of an enlarged diameter, and a ratio of said enlarged diameter to said piston diameter being between 0.9 and 1.01; and
   said second cavity includes a first enlarged cylindrical portion, and a second smaller portion adjacent to the closure face, with the second smaller portion receiving an end of the spring.

3. A fuel supply system incorporating:
   a fuel pump delivering fuel from a filter, and a tap for supplying a pressure upstream of said filter to a bypass valve, said bypass valve including a valve sleeve received within a housing, and a piston spring-biased such that an upstream end of said piston abuts a stop face on said valve sleeve through a cylindrical contact surface, with said spring extending away from said piston and a tap for supplying a fluid pressure into a bore defined within said valve sleeve such that the fluid pressure will act against a bias force of said spring;
   the piston extending along an axial dimension with a seal face at the upstream end, and a closure face closing off a cavity defined radially inwardly and downstream of said upstream end, said closure face being spaced from said upstream end by a first distance, and said piston having a bore extending in a rearward direction away from an opposed side of said closure face to a second end, with a piston diameter defined to an outer periphery of a cylindrical portion forming said seal face, and a ratio of said piston diameter to said first distance being between 3.05 and 6.31; and
   the valve sleeve extending between an upstream end and a second downstream end, with a sleeve internal bore formed between said upstream and second ends, and windows being formed in said valve sleeve to allow flow of fluid from said bore through said windows and to a downstream port, said bore having an inner diameter, and said windows having an axial dimension and a circumferential dimension, and a ratio of said inner diameter to said axial dimension being between 0.91 and 1.02, and a ratio of said inner diameter to said circumferential dimension being between 1.55 and 1.85;
   wherein a ratio of said piston diameter to said inner diameter being between 1.07 and 1.10;
   wherein said closure face also defining a second cavity extending in the downstream direction from the closure face, with the second cavity receiving a spring; and
   said closure face also defining a second cavity extending in the downstream direction from the closure face, with the second cavity receiving a spring.

4. The system as set forth in claim 3, wherein said second cavity includes a first enlarged cylindrical portion, and a second smaller portion adjacent to the closure face, with the second smaller portion receiving an end of the spring.

5. A method of replacing a component in a bypass valve including the steps of:
   removing a valve sleeve and replacing said removed valve sleeve with a replaced valve sleeve, with the valve sleeve received within a housing, and a piston spring-biased such that an upstream end of said piston abuts a stop face on said valve sleeve through a cylindrical contact surface, with said spring extending away from said piston and a tap for supplying a fluid pressure into a bore defined within said valve sleeve such that the fluid pressure will act against a bias force of said spring;

wherein the replaced valve sleeve extending between an upstream end and a downstream end, with a sleeve internal bore formed between said upstream and downstream end, and windows being formed in said valve sleeve to allow flow of fluid from said bore through said windows and to a downstream port, said bore having an inner diameter, and said windows having an axial dimension and a circumferential dimension, and a ratio of said inner diameter to said axial dimension being between 0.91 and 1.02, and a ratio of said inner diameter to said circumferential direction being between 1.55 and 1.85.

6. The method as set forth in claim 5, wherein both the valve sleeve and said piston are removed and replaced.

* * * * *